No. 653,591.
H. POUPART.
BEER FAUCET.
(Application filed Dec. 11, 1899.)
Patented July 10, 1900.
(No Model.)
2 Sheets—Sheet 1.
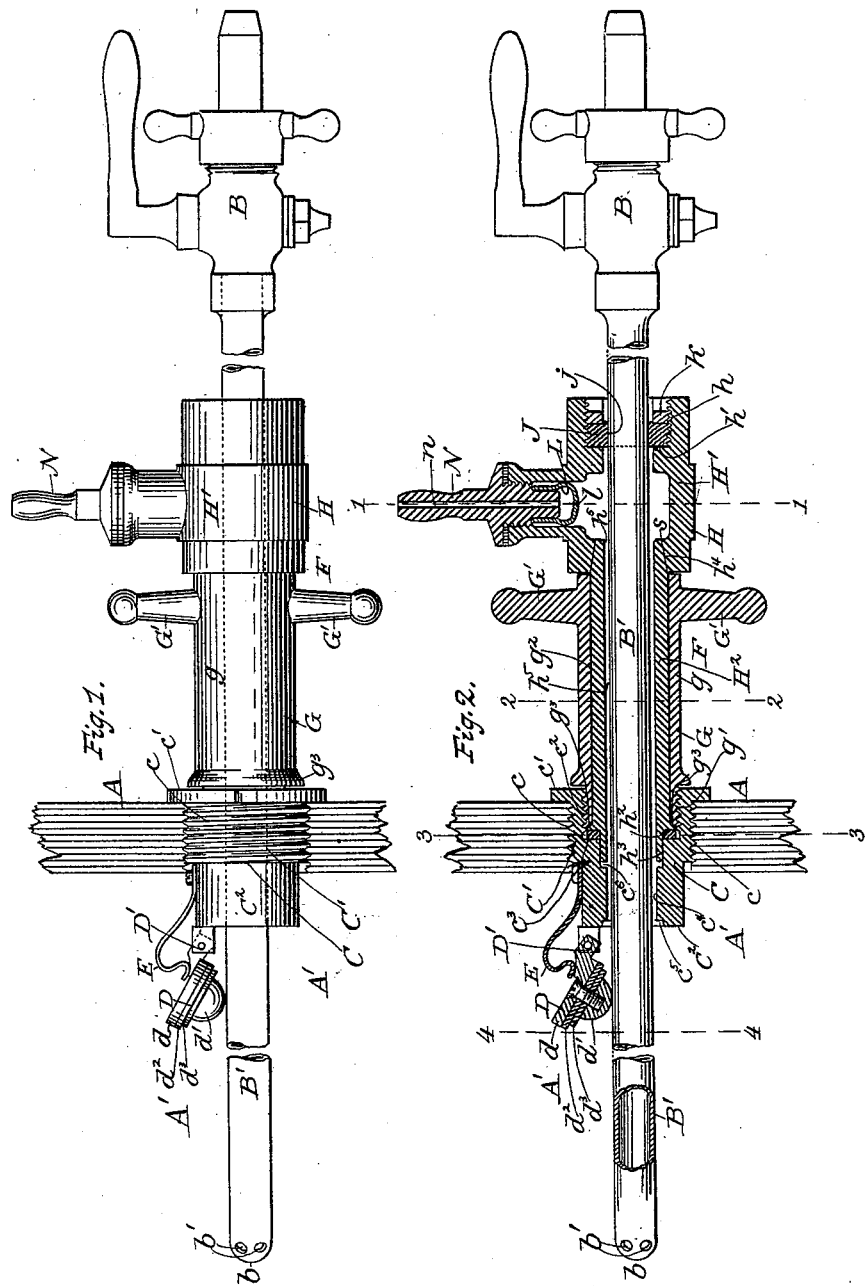
Witnesses
Henry Poupart,
Inventor
by Alex. Selkirk
Attorney No. 653,591. Patented July 10, 1900.
H. POUPART.
BEER FAUCET.
(Application filed Dec. 11, 1899.)
(No Model.) 2 Sheets—Sheet 2.

Witnesses
Charles Selkirk
H. Selkirk Jr.

Henry Poupart,
Inventor.
by Alex. Selkirk
Attorney

UNITED STATES PATENT OFFICE.

HENRY POUPART, OF COHOES, NEW YORK.

BEER-FAUCET.

SPECIFICATION forming part of Letters Patent No. 653,591, dated July 10, 1900.

Application filed December 11, 1899. Serial No. 739,964. (No model.)

*To all whom it may concern:*

Be it known that I, HENRY POUPART, a citizen of the United States, and a resident of the city of Cohoes, in the county of Albany and State of New York, have invented certain new and useful Improvements in Beer-Faucets, of which the following is a specification.

My invention relates to faucets for beer, ale, and other liquids; and it consists of the novel features of devices and novel combinations of parts and devices herein shown and described, and set forth in the claims.

The objects and advantages of the invention will be fully understood from the following description and claims when taken in connection with the annexed drawings, in which—

Figure 3:
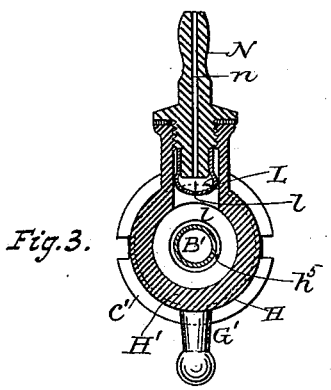
Figure 4:
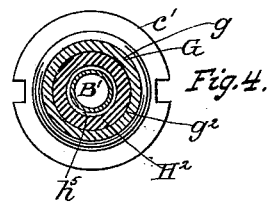
Figure 5:
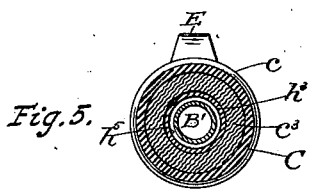
Figure 6:
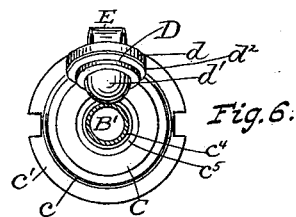
Figure 7:
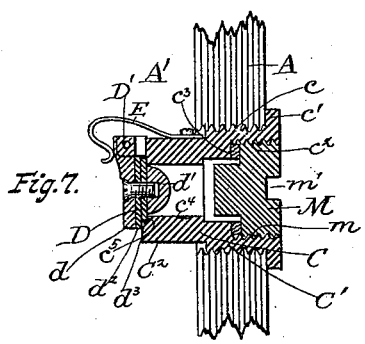
Figure 8:
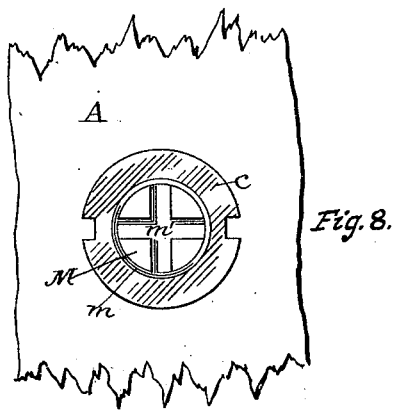

Figure 1 is a side elevation of the faucet and adjuncts embodying my improvements. Fig. 2 is a longitudinal section of the same. Fig. 3 is a transverse section taken at line 1 in Fig. 2. Fig. 4 is a transverse section at line 2 in Fig. 2. Fig. 5 is a transverse section taken at line 3 in Fig. 2. Fig. 6 is a view of rear end of the device, taken at line 4 in Fig. 2. Fig. 7 is a section of the bush part of the invention and a section of the head of the vessel and closed for transportation, and Fig. 8 is an end view of the bush from its plugged end.

Similar marks of reference refer to similar parts throughout the several views.

In the drawings, A is the head of a keg, cask, or other vessel for containing beer or other liquid, and A' is the chamber of the same.

B is a faucet, of any suitable construction, and B' is a draft-tube having one end secured to the inlet $b$ of the faucet and its opposite end reduced to a conical form and provided with perforations $b'$ for service as inlet-openings to the chamber of said tube from the chamber A' of the vessel. This draft-tube and faucet B, secured thereto, are both old and well known, and therefore do not require a particular description.

C is the vessel-closing bush, which consists of a single piece of metal embodying the body C', provided with exterior screw-thread $c$, notched flange $c'$, internal-screw-threaded plug-chamber $c^2$, seat $c^3$, and inner end extension $C^2$, having through it the central smooth bore $c^4$ of diameter greater than the diameter of the draft-tube B', outside measure, and communicating with the plug-chamber $c^2$ and having at its rear end the seat $c^5$, annular to the smooth bore $c^4$. This bush C may be made of any suitable metal or alloy, yet I at present prefer to make it of iron and coated with tin or other suitable coating substance which is adapted to prevent rust forming on its surfaces.

D is the inner-end-closing valve, comprising the end-closing disk $d$, having a metallic boss $d'$, and spherical boss $d'$, projected from the front side of said disk and of diameter about corresponding with that of the bore $c$ and having its base terminating with seat $d^2$, which receives a packing washer or gasket $d^3$. This valve D is connected to the rear end of the extension $C^2$ of the bush in a jointed manner and preferably by means of a suitable hinge D', having its respective knuckles secured one to the said extension $C^2$ and the other to the disk $d$ from its rear side. E is a suitable spring adapted to hold the said end-closing valve D tightly seated against the rear end of the extension $C^2$ and closing the bore of the same. This spring may be of any suitable form and material and is adapted to swing the valve inward and seated tight against the end of said extension as soon as the force or device holding the valve open is removed. One end of this spring is rigidly secured to the extension $C^2$, preferably by means of screws, while the free end has bearing on the rear side of the disk $d$ of the valve at a point near the hinge-flap secured to said disk.

F is a sectional coupling device or sleeve by means of which the faucet B and its connected draft-tube B' are suitably connected with the vessel A, with the perforated conical end of said draft-tube within the chamber of the said vessel and the faucet at any preferred distance from the forward end of this coupling-sleeve. This coupling-sleeve F comprises the bush-closing piece G and the draft-tube-holding piece H, loosely secured to each other, so that each said piece may be freely revolved on its axis in relation to the other. The bush-closing piece G is made of any suitable length, and comprises the tubular-form body $g$, provided with rear end screw-threaded stem $g'$, bore $g^2$, and rear end annular recess $g^3$. This bush-closing piece G is provided with any suitable means by which it may be revolved in suitable direction for screwing the stem $g'$ into the screw-threaded chamber $c^2$ and out from the same, as may be preferred, by means of a wrench or other instrument, yet I preferably provide said piece G with one or more arms G', preferably integral with the body of said piece. The draft-tube-holding piece H is made of any suitable length, and comprises the body H', containing the screw-threaded chamber $h$, seat $h'$, tubular spindle H², having at its rear end the annular flange $h^2$ and nipple $h^3$, the latter projected rearward from said flange and of diameter corresponding with the depth of the chamber $c^6$, which communicates from the smooth bore $c^4$ of the bush C to the screw-plug chamber $c^2$ of the same. The tubular spindle H² may be made integral with the body H', and the annular flange $h^2$ may be made of a separate piece and be secured on the spindle after the latter has been passed through the bore $g^2$ of piece G and the flange has been seated in the annular recess $g^3$, yet I at present prefer to form the said tubular spindle H² of a piece separate from the body H' and secure the forward end portion of this spindle in the inner end bore $h^4$ of the said body by solder applied by process known as "sweating." This spindle H² (shown in Fig. 2 to be united to the body H by solder at line $s$) has my preferred form of water and air tight joint connection. The bore $h^5$ of the spindle H² is larger in diameter than the outside diameter of the draft-tube B' and is in correspondence with the diameter of bore $c$ of the end extension C² of the bush C, so as to produce all around between said draft-tube and said spindle the chamber $i$, which communicates from the chamber A' of the vessel A to the valve-chamber I in the body H.

J is an annular elastic compress of elastic rubber of diameter corresponding with the screw-threaded chamber $h$ and is provided with a central bore $j$ of diameter corresponding with that of the outside diameter of the draft-tube B' and with a thickness of one-quarter of an inch more or less. This annular compress seats on seat $h$, while the centrally-perforated and screw-threaded compressor K, screwing into the screw-threaded chamber $h$, Fig. 2, seats on the forward side of the said compress J, and when pressed against the latter by the joint operations of the screw-threads of the chamber $h$ and the compressor K when the latter is turned in proper direction the substance of the compress J will be forced tight all around the outer circumference of the draft-tube B', which may be in the bore of said compressor.

L is an air-valve made, preferably, of rubber and in form of a nipple of a nursing-bottle, and has its lower curved end wall slitted at $l$, which slit opens under pressure of air from outside and allows the air forced through said valve to pass into the valve-chamber and thence through the bore-chamber $h^5$, between spindle H² and the draft-tube B', into the chamber A' of the vessel A.

M is the bush-closing plug, provided with screw-threads $m$ and slots $m'$ for receiving a suitable instrument for revolving said plug for screwing the same into or out from the said bush when the coupling-sleeve F is detached from the bush C, as shown in Figs. 7 and 8.

When the vessel A is received full of the liquid to be drawn therefrom, the plug M will be screwed in place in the bush C and the valve D will be in place, closing the inner end of the extension C² of said bush, tightly closing the vessel from escape of the liquid by the way of said bush. When the liquid is to be drawn from the vessel, the plug M will be removed from the bush, and the operator will then connect the coupling-sleeve F to the bush C by screwing the screw-threaded stem $g'$ in the screw-threaded portion of the said bush and tight on the gasket $c^3$. The operator will then thrust the inlet end of the draft-tube B' through the coupling-sleeve F and bush C by passing it first through the perforation in the compressor K, when it is loosely in place in the screw-threaded recess $h$ and not bearing on the annular elastic compress J and force said draft-tube endwise through said compress and through the central bore of the coupling-sleeve F and the bush C, when the curved end wall of the said tube will force valve D back and away from the seat $c^5$ of bush extension C² and to such a distance in the chamber A' of the vessel as may be preferred. The compressor K will then be screwed tight on the compress J and tighten the latter on the draft-tube B', when at will the liquid in the vessel may be drawn therefrom through the faucet B. When air is required to be forced into the vessel A for giving pressure to the liquid within, the operator will, by means of any suitable force-pump and hose between the same and the perforated closing-piece N, force air in sufficient volume through the conduit $n$ and the slit $l$ in the valve L and thence through bore-chamber $h^5$ out and into the chamber of the vessel A. By this means any degree of pressure desired may be applied to the liquid in the vessel for forcing the liquid within to pass out therefrom by the way of the draft-pipe B' and the faucet B when the latter is turned open.

Having described my invention, what I claim, and desire to secure by Letters Patent, is—

1. The combination with metallic vessel-closing bush C, having its main body C' provided with external screw-threads $c$, notched flange $c'$, and internal-screw-threaded chamber $c^2$, and having integral with its rear end the extension C² provided with the smooth bore $c^4$, of valve D provided on its inner side with the metal semispherical boss $d'$ and gasket $d^3$, hinge D' and closing-spring E, whereby the inner end of the said extension shall be closed automatically while a screw-threaded plug is screwed into the said bush, and the valve D be opened when the draft-tube of a faucet is forced through said extension $C^2$ with its intake end into the chamber of the vessel said bush is inserted in, substantially as and for the purposes set forth.

2. The combination with the external-screw-threaded bush C provided with internal-screw-threaded chamber $c^2$ and having integral with it the chambered extension $C^2$ opening to the chamber of the vessel into which the said bush is screwed, end-closing valve D provided with metallic boss $d'$ and gasket $d^3$, and hinge $D'$, of the sectional coupling device F comprising the hollow bush-closing piece G having its screw-threaded stem $g'$ screwing into the screw-threaded chamber $c^2$ of the bush and provided with means for revolving it in either direction, and the draft-tube-holding piece H having fixedly connected to the rear end of its body part $H'$ the hollow spindle $H^2$ on which the hollow bush-closing piece freely revolves, the elastic ring-form compress J and screw-threaded compressor K screwed into the front end of body part $H'$, of the tube-holding piece and against the said compress, and the draft-tube of a faucet, having its intake end extended back through said draft-tube-holding piece H to past the open end of the rear extension of the bush C and its forward end portion gripped by the said elastic compress, substantially as and for the purposes set forth.

3. The combination with external-screw-threaded bush C provided with internal-screw-threaded chamber $c$ and smooth-chambered extension $C^2$ integral with said bush and communicating with the chamber of a liquid-holding vessel, and valve D provided with the metallic boss $d'$, gasket $d^3$ and hinged to said extension, tubular spindle $H^2$, draft-tube-holding piece $H'$ fixedly connected with the forward end of said tubular spindle and having in its outer end portion the screw-threaded chamber $h$, an air-inlet and an air-valve between the chamber the bore-chambers of the tubular spindle $H^2$ and extension $C^2$, of the bush, and the outside atmosphere, of the bush-closing piece G screwed to said bush and holding the draft-tube-holding piece $H'$ connected with said bush, centrally-perforated elastic compress J and compressor K within the screw-threaded chamber $h$, and draft-tube $B'$ having an outside diameter smaller than the diameter of bore $c^4$ of extension $C^2$ of the bush and bore $h^5$ of spindle $H^2$, and having its forward end portion held by the grip of the said compress J, substantially as and for the purposes set forth.

HENRY POUPART.

Witnesses:
   CHARLES SELKIRK,
   A. SELKIRK, Jr.